United States Patent [19]

Tipton

[11] Patent Number: 5,208,461
[45] Date of Patent: May 4, 1993

[54] ULTRA-VIOLET WASTEWATER DISINFECTION SYSTEM

[75] Inventor: Frederick D. Tipton, Milford, Ohio

[73] Assignee: Simon Hydro-Aerobics, Inc., Milford, Ohio

[21] Appl. No.: 770,604

[22] Filed: Oct. 3, 1991

[51] Int. Cl.⁵ ............................................ C02F 1/32
[52] U.S. Cl. .................................. 250/436; 250/437; 250/438; 210/748
[58] Field of Search ............... 250/436, 437, 438, 435; 422/24; 210/748

[56] References Cited

U.S. PATENT DOCUMENTS

| | | |
|---|---|---|
| 1,079,503 | 11/1913 | Linker . |
| 1,193,134 | 8/1916 | Henri et al. . |
| 1,954,065 | 4/1934 | Bragg . |
| 3,037,116 | 5/1962 | Weber . |
| 3,079,498 | 2/1963 | Ruffin . |
| 3,498,457 | 3/1970 | Gough . |
| 3,628,445 | 12/1971 | Weber . |
| 3,637,342 | 1/1972 | Veloz . |
| 3,741,693 | 10/1969 | Veloz . |
| 3,814,680 | 6/1974 | Wood . |
| 3,924,139 | 12/1975 | Hirose et al. . |
| 4,103,167 | 7/1978 | Ellner . |
| 4,204,956 | 5/1980 | Flatow . |
| 4,255,383 | 3/1981 | Schenck . |
| 4,372,860 | 2/1983 | Kaas . |
| 4,400,270 | 8/1983 | Hillman . |
| 4,471,225 | 9/1984 | Hillman . |
| 4,621,195 | 11/1986 | Larsson . |
| 4,676,896 | 6/1987 | Norton . |
| 4,849,115 | 7/1989 | Cole et al. . |
| 4,909,931 | 3/1990 | Bibi . |
| 5,019,256 | 5/1991 | Ifill et al. . |
| 5,151,174 | 9/1992 | Wiesmann .............................. 210/97 |

FOREIGN PATENT DOCUMENTS

| | | |
|---|---|---|
| 2630496 | 12/1977 | Fed. Rep. of Germany ........ 422/24 |
| 433368 | 1/1911 | France . |

Primary Examiner—Jack I. Berman
Attorney, Agent, or Firm—Wood, Herron & Evans

[57] ABSTRACT

An ultra-violet wastewater disinfection system is disclosed in which wastewater flows through a treatment chamber having a plurality of tube-type ultra-violet lamps in a parallel array supported therein at an acute angle with respect to the flow of wastewater through the treatment chamber. In this configuration, the wastewater flows through the array of lamps regardless of the depth of the water in the treatment chamber. The wet/dry configuration wherein a portion of the lamps is submerged and a portion of the lamps is not submerged provides very desirable results in terms of the kill rate of fecal coliform present in wastewater.

17 Claims, 3 Drawing Sheets

ULTRA-VIOLET WASTEWATER DISINFECTION SYSTEM

FIELD OF THE INVENTION

The present invention is directed to a wastewater disinfection system, and more particularly to a flow-through system which utilizes ultra-violet radiation to disinfect wastewater.

BACKGROUND OF THE INVENTION

The disinfection of wastewater is the process of selective destruction of disease-causing micro-organisms contained therein. This is distinguishable from sterilization, for example, which is the destruction of all micro-organisms. In wastewater treatment, the three categories of micro-organisms of greatest concern are disease-causing bacteria, bacterial viruses, and amoebic cysts. Diseases which may be caused by water-borne bacteria include typhoid, cholera, paratyphoid, and bacillary dysentery. Diseases which may be caused by water-borne viruses include poliomyelitis and infectious hepatitis.

There are many known techniques for disinfecting wastewater, including the use of chemical or physical agents, mechanical means, and ultra-violet radiation. Of these, the traditional method of disinfection has been the use of chemical agents in the form of chlorine. Chlorine usage has numerous drawbacks, however, including the fact that it is expensive and may pollute effluent water with undesirable by-products.

There are numerous disinfection systems which utilize ultra-violet radiation to disinfect wastewater. For example, U.S. Pat. No. 3,637,342 discloses an ultra-violet fluid sterilizer; U.S. Pat. No. 3,924,139 discloses a photo-oxidation apparatus utilizing oxidizing agents in combination with ultra-violet radiation; U.S. Pat. No. 4,103,167 discloses an ultra-violet liquid purification system; U.S. Pat. No. 4,204,956 discloses a water purification system utilizing ultra-violet radiation. The following U.S. Pat. Nos. 4,400,270, 4,471,225, 4,621,195, 4,676,896, and 4,909,931, also disclose ultra-violet disinfection apparatus.

In light of current environmental regulations relating to the quality of the effluent discharged from wastewater treatment systems, it is imperative that wastewater treatment systems provide consistent, highly effective disinfection of wastewater. The system of the present invention accomplishes that objective.

SUMMARY OF THE INVENTION

The present invention is directed to an ultra-violet wastewater disinfection system which meets or exceeds applicable regulatory standards for the quality of effluent from a wastewater treatment system.

In its broadest aspects, the system of the present invention includes a flow-through treatment chamber having an inlet end and an outlet end. The disinfection treatment chamber is preferably made of polished stainless steel so as to reflect the ultra-violet light within the chamber for added efficiency. A plurality of tube-type ultra-violet lamps are disposed within the treatment chamber, during operation of the system, at an acute angle with respect to the flow of the wastewater through the treatment chamber. The UV lamps are preferably supported at the desired angle by a suitable rack or support structure. Furthermore, the lamps are preferably oriented so that the array of lamps slopes downwardly from the input end of the chamber to the outlet end of the chamber. In this configuration, the wastewater flows through the array of ultra-violet lamps, which serves the dual functions of a macroscopic "screen" that acts as a flow control baffle and directionalizes the wastewater flow, and to disinfect the wastewater with ultra-violet radiation. The angled orientation of the UV lamps is advantageous in that all of the wastewater to be treated passes between and/or around the lamps, regardless of the flow rate and regardless of the level of the wastewater in the chamber. Furthermore, as the water level rises in the treatment chamber, a greater portion of the ultra-violet lamps become submerged, thereby enabling more UV rays to be radiated into the deeper waters in the chamber.

In a preferred embodiment, the system includes a rack or support structure for supporting the ultra-violet lamps at the desired angle in the treatment chamber. This rack is preferably suspended from the lid so that when the lid is pivoted to an open position the rack and lamps are lifted from the treatment chamber, thereby facilitating cleaning the lamps. Furthermore, each of the ultra-violet-lamps is housed in a waterproof, protective housing such as a quartz tube, which is similar to an oversized test tube. The protective tube prevents water from contacting the UV lamps. Additional features of the system of the present invention include a hinged lid for the treatment chamber which has a reflective panel on the inside surface thereof to increase the ultra-violet light intensity within the treatment chamber by reflecting the UV light downwardly into the waste-water.

Finally, the system includes means for controlling the operation thereof. In a preferred embodiment, the control means is an automatic power switch mounted on the outside of the treatment chamber. When the lid of the treatment chamber is opened, the power to the UV lamps is automatically shut off.

In an alternative embodiment, the treatment chamber may include a plurality of arrays of lamps, each of which arrays is disposed at an acute angle with respect to the flow of wastewater through the treatment chamber. The arrays of lamps are also preferably parallel to one another. In a further preferred embodiment, all the lamps in a single array are of the same intensity, but each array has lamps of different intensities. In this way, specific organisms in the wastewater are killed by the different lamps. For example, there may be a first array of low intensity lamps intended to kill one type of organism and a second array of high intensity lamps intended to kill a different organism present in the same waste-water.

In an additional alternative embodiment, the inlet to the treatment chamber is at a higher vertical elevation than the outlet from the chamber and the floor of the treatment chamber is angled downwardly, substantially parallel the UV lamps. With this configuration, the efficiency of the system is further enhanced because the wastewater is subjected to greater amounts of UV radiation at higher intensity for a longer time.

In comparative testing of the angularly disposed UV lamp configuration of the present invention it has been shown that surprising and advantageous bacteria kill rates can be achieved vis-a-vis prior art-type systems wherein the UV lamps are either totally submerged or are positioned completely above the water level.

DETAILED DESCRIPTION OF THE INVENTION

Figure 1:
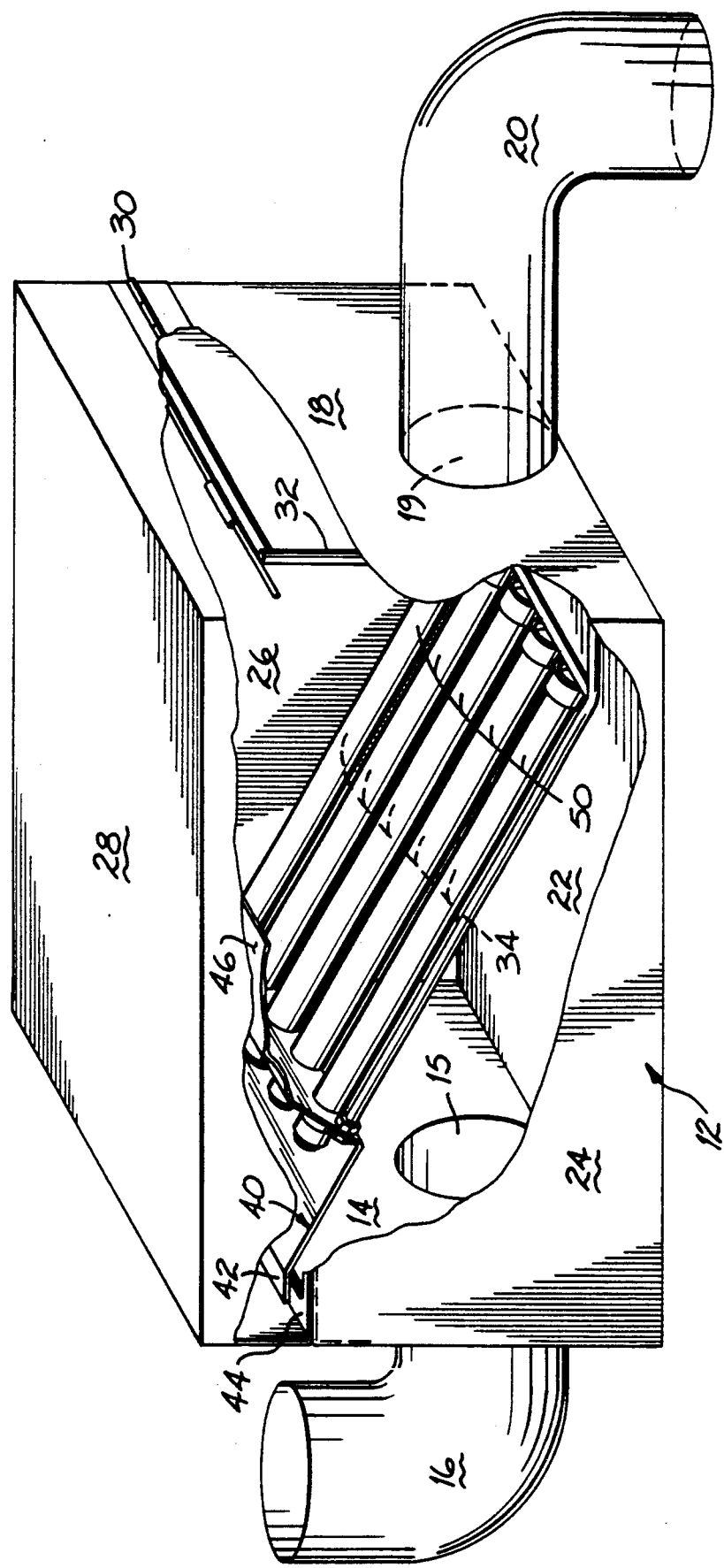
FIG. 1 is a perspective view, partially broken away, of one embodiment of the system of the present invention.

FIG. 1 is a perspective view of a preferred embodiment of the ultra-violet wastewater disinfection system of the present invention. System 10 comprises a wastewater treatment chamber 12 which is preferably a box made of 16 gauge polished stainless steel having an inlet end 14 including an inlet opening 15 to which is connected a suitable tube or conduit 16 for delivering the wastewater to treatment chamber 12. Chamber 12 further includes an outlet end 18 having an outlet opening 19 therein to which is connected suitable tube or conduit 20 through which the treated wastewater is discharged. Treatment chamber 12 further comprises a bottom surface 22, side walls 24 and 26 and a lid 28 which is hingedly mounted along outlet end wall 18 by means of a suitable hinge 30. The inside surface of lid 28 is preferably a reflective material for reflecting the ultra-violet radiation back downward into the wastewater being treated.

Figure 2:
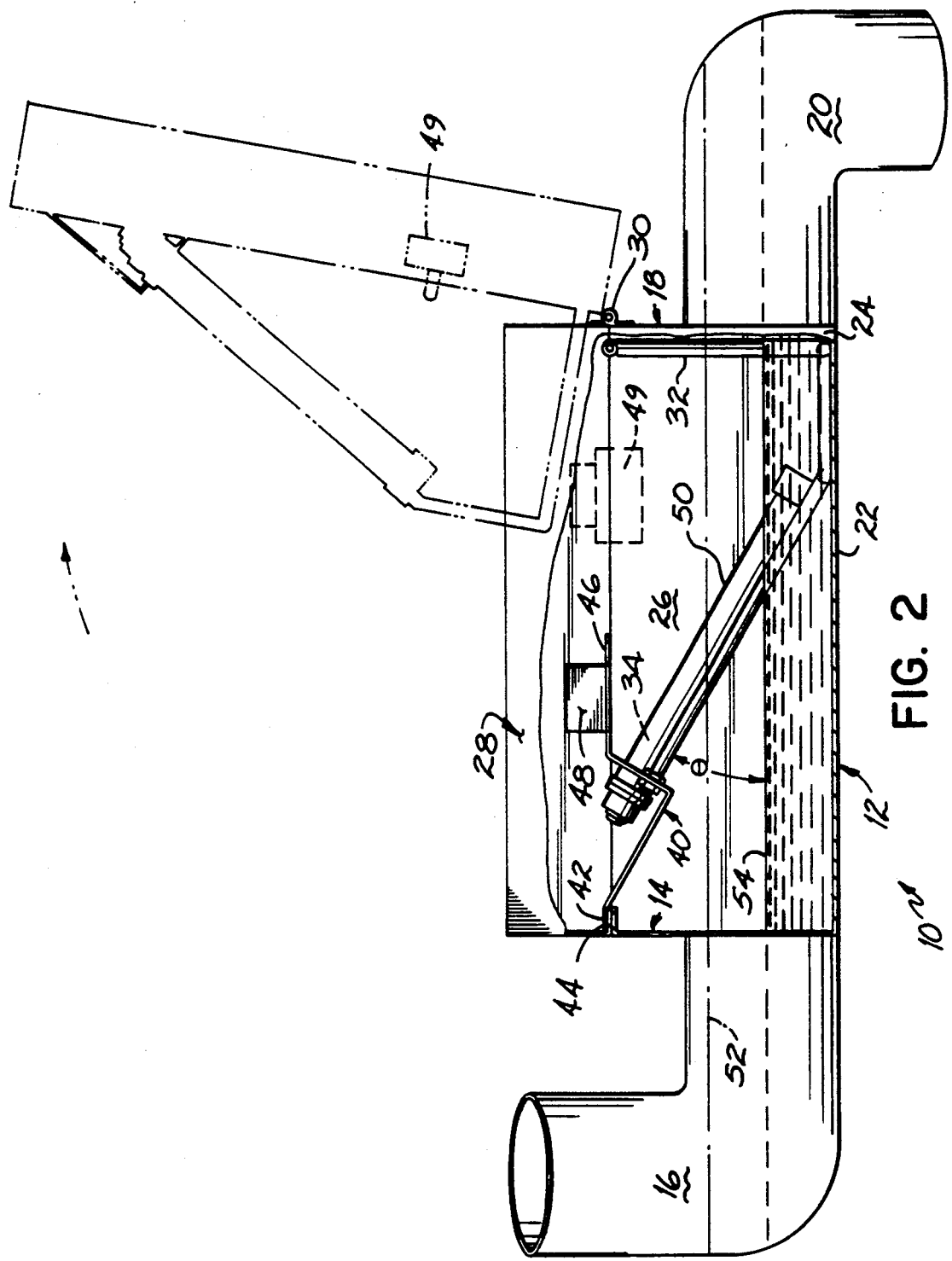
FIG. 2 is a side elevation, partially broken away, of the system of the present invention with the lid shown in phantom in a raised position.
Figure 3:
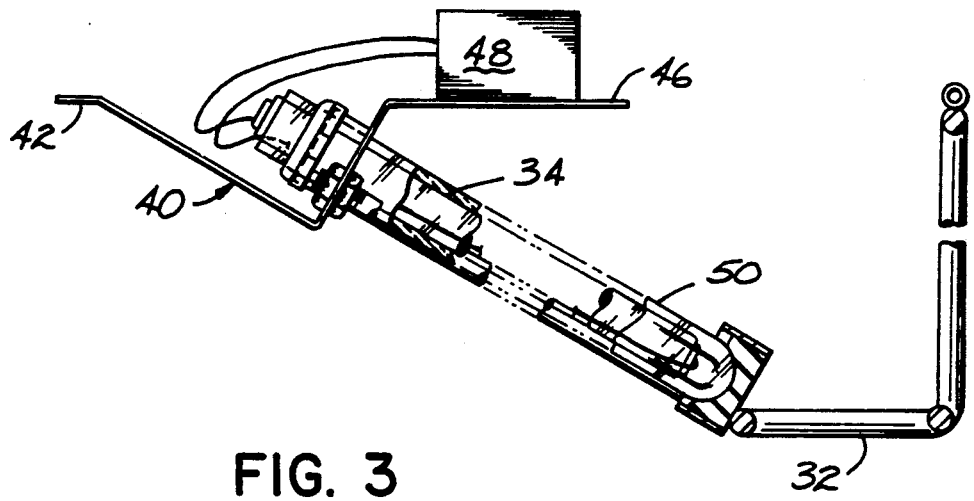
FIG. 3 is a side elevation of the rack and ultra-violet tube assembly used in the system of the present invention.

With reference to FIGS. 1-3, wastewater treatment system 10 further comprises a rack 32 for supporting a plurality of tube-type ultra-violet lamps 34 in a parallel spaced array. Lamps 34 are positioned and supported by rack 32 so as to define an acute angle $\theta$ with respect to the flow of wastewater through chamber 12. The specific angle $\theta$ of the array of ultra-violet lamps is not critical; however, the lamps are preferably disposed at an angle of approximately 30° relative to the flow of wastewater.

Rack 32 is preferably constructed of materials which are not deleteriously affected by prolonged contact with wastewater. Furthermore, rack 32 is designed to be removably suspended from lid 28 of chamber 12 so that it rests on bottom surface 22 when lid 28 is closed, but is lifted out of chamber 12 when lid 28 is raised. Rack 32 includes a support plate 40 which includes a lip 42 that is secured to peripheral inside ledge 44 of lid 28. Support plate 40 also includes a support segment 46 to which is secured a suitable power supply or electrical junction box 48 for UV lamps 34. An automatic power switch 49 is preferably affixed to the outside of treatment chamber 12 so that the power to the system automatically shuts off when lid 28 is opened, as shown in phantom in FIG. 2.

With the configuration of support rack 32 as shown and described, the array of UV tubes is lifted from the treatment chamber 12 when lid 28 is pivoted to an open position (as shown in phantom in FIG. 2). This allows easy cleaning of the protective tubes 50 which house the UV lamps 34 and replacement of UV lamps 34. Furthermore, with this configuration, all the wastewater passing through treatment chamber 12 by necessity passes through the array of UV lamps, flowing around the lamps and therebetween to provide sufficient exposure time of the wastewater to the UV radiation to effect disinfection of the wastewater. Regardless of the depth of the wastewater in treatment chamber 12, all the water passes through the array of lamps 34, with a greater portion of each lamp being submerged as the liquid level becomes higher. This is shown in FIG. 2 wherein liquid level 52 (shown in phantom) submerges a greater portion of UV tubes 34 than liquid level 54 and thus exposes the deeper water in the chamber to more UV radiation. Additionally, based on the angled orientation of the UV lamps, the UV lamps are in a wet/dry orientation during operation of the system wherein a portion of the lamps is submerged and a portion is not submerged. The nonsubmerged portion transmits UV radiation throughout the box through the air and those rays are reflected back down into the wastewater by the reflective surface on the inside of lid 28. This angled orientation of the lamps provides very surprising and advantageous results in terms of the disinfection effectiveness or kill rate, as illustrated in the following Examples.

EXAMPLE 1

In this Example, the UV lamps were positioned in a treatment chamber in a totally submerged fixed horizontal position. With this configuration, the goal of disinfecting the influent water to a fecal coliform count of 200/100 ml or less in a 24 hour sample was not achieved. The results in this Example were discounted because of the variation in height of the liquid level; the desired level of fecal coliform count was not met.

EXAMPLE 2

In this Example, the UV lamps were positioned in a completely above-water level position such that no portion of the UV lamps were submerged at any time. The experimental testing was conducted by the Clermont County EPA Department at the Bramblewood Subdivision project site. The results were as shown in Table I below.

TABLE I

| DATE | INFLUENT FECAL COUNT BEFORE UV | EFFLUENT FECAL COUNT AFTER UV |
| --- | --- | --- |
| 4/03/91 | 12,000 | 2,000 |
| 4/19/91 | 24,000 | 8,000 |
| 4/23/91 | 12,000 | 4,000 |
| 5/03/91 | 2,500 | 470 |
| 5/20/91 | 12,000 | 600 |
| 5/29/91 | 69,000 | 1,500 |

Although a fecal coliform count of 470/100 ml was achieved, in one test run, that is still unsatisfactory since it does not meet the goal of 200/100 ml or less in a 24 hour sample.

EXAMPLE 3

In this Example, the system of the present invention was tested with the lamps in an angular orientation as shown in the Figs., thus radiating UV energy in the liquid flowing through the unit and above the water level line. As the flow rate increases and the water level rises in the treatment chamber and more of the lamps are submerged, UV radiation continues to be transmitted throughout the box through the air since a portion of the lamps are out of the water. The results of this test, which was run by Winelco Services, are shown in Table II below.

TABLE II

| DATE | FECAL COUNT BEFORE UV | FECAL COUNT AFTER UV |
|---|---|---|
| 7/18/91 | 55,000 | 0 |
| 7/18/91 | 24,000 | 200 |
| 7/18/91 | 29,374 | 31 |
| 7/26/91 | 22,629 | 54 |
| 8/1/91 | 5,949 | 34 |

Based on the results shown in Table II, the goal of a fecal coliform count of 200/100 ml or less in a 24 hour period was achieved in every test run utilizing the system of the present invention wherein the UV lamps are disposed at an acute angle with respect to the flow of wastewater through the treatment chamber.

The UV lamps used in the system of the present invention may be lamps such as 18", 25 watt G25T8 lamps manufactured by General Electric. The characteristics of the lamps used in the tests described in the above examples are tabulated in Table III, wherein the maximum intensity of the UV radiation, as measured at the noted distance perpendicular to a bare tube, are given.

TABLE III

| Watts/sq. ft. at 2" | 4.20 |
|---|---|
| Watts/sq. ft. at 4" | 2.07 |
| Watts/sq. ft. at 8" | 1.00 |
| Watts/sq. ft. at 12" | .54 |

In the system of the present invention, all the wastewater being treated passes between and around the UV lamps and therefore is exposed to the maximum intensity thereof. Furthermore, the additional radiation emanating from the portion of the lamps which is not submerged in the wastewater is reflected downwardly by the reflecting surface of lid 28. This further enhances the efficiency of the system.

Figure 4:
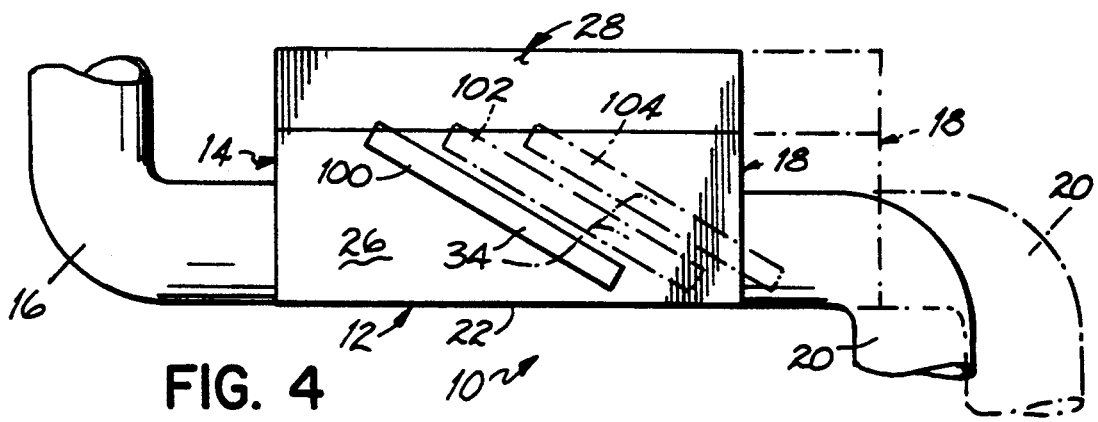
FIG. 4 is a schematic side elevation of an alternative embodiment of the system of the present invention.

In an alternative embodiment shown schematically in FIG. 4, treatment system 10 may include a plurality of arrays 100, 102, and 104 of parallel ultra-violet lamps which are all arranged parallel to one another and disposed at an acute angle with respect to the flow of wastewater through the treatment chamber. In this embodiment, each individual array of UV lamps may contain UV lamps of one intensity which is intended to kill one specific type of bacteria in the wastewater. Thus with multiple arrays, many different bacteria types can be killed.

Figure 2A:
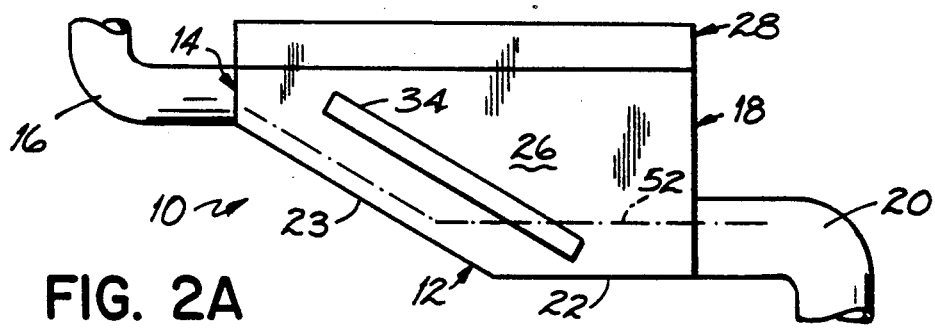
FIG. 2A is a schematic side elevation of an alternative embodiment of the present invention.

An additional alternative embodiment of system 10 is shown in FIG. 2A. In the embodiment shown, treatment chamber 12 has a bottom surface comprising two sections; namely, horizontal section 22 and angled section 23 which is preferably substantially parallel to UV lamps 34. In FIG. 2A, the wastewater flow is shown in phantom as 52. With this configuration, the wastewater is exposed to UV radiation of greater intensity for a longer period of time since it flows down angled section 23 in relatively close proximity to lamps 34.

It will be appreciated by persons skilled in the art that various modifications may be made to the system of the present invention as described herein without departing from the scope of the present invention which is defined by the appended claims.

What is claimed is:

1. A wastewater disinfection system, comprising:

a flow-through treatment chamber for treating wastewater, said chamber having an inlet end and an outlet end for the wastewater; and a plurality of tube-type ultra-violet lamps positioned in a parallel array within said treatment chamber during operation of the system, said array of lamps disposed at an acute angle with respect to and transverse to the flow of the wastewater therethrough so that the wastewater passes through said array of ultra-violet lamps as it flows through said treatment chamber and is thereby disinfected, said array of lamps serves the dual functions of disinfecting the wastewater and acting as a flow control baffle to directionalize the wastewater flow.

2. The system of claim 1 further comprising rack means for supporting said array of lamps in said treatment chamber at the desired angle.

3. The system of claim 2 wherein the lower end of each of said lamps is adjacent said outlet end of said chamber and the upper end of each of said lamps is adjacent said inlet end of said chamber during operation of the system.

4. The system of claim 1 wherein each of said lamps is housed within a protective, waterproof tube.

5. The system of claim 1 wherein said treatment chamber has a substantially planar, horizontal bottom surface.

6. A wastewater disinfection system, comprising:

a flow-through treatment chamber for treating wastewater, said chamber having an inlet end and an outlet end for the wastewater and a bottom surface;

a plurality of tube-type ultra-violet lamps positioned in a parallel array within said treatment chamber during operation of the system, said array of lamps disposed at an acute angle with respect to and transverse to the flow of the wastewater therethrough so that the wastewater passes through said array of ultra-violet lamps as it flows through said treatment chamber and is thereby disinfected, and at least a portion of said bottom surface is angled and disposed substantially parallel to said ultra-violet lamps.

7. A wastewater disinfection system, comprising:

a flow-through treatment chamber for treating wastewater, said chamber having an inlet end and an outlet end for the wastewater;

a plurality of tube-type ultra-violet lamps positioned in a parallel array within said treatment chamber during operation of the system, said array of lamps disposed at an acute angle with respect to the flow of wastewater through said chamber so that the lower end of each of said lamps is adjacent said outlet end of said chamber and the upper end of each of said lamps is adjacent said inlet end of said chamber during operation of the system, whereby the wastewater passes through said array of ultra-violet lamps as it flows through said treatment chamber and is thereby disinfected;

rack means for supporting said array of lamps in said treatment chamber at the desired angle, said rack means being suspended from said lid such that said rack means and said array of lamps are lifted from said chamber when said lid is pivoted to an open position, thereby facilitating cleaning said lamps; and means for controlling the operation of said system.

8. The system of claim 7 wherein said control means automatically disengages the system in response to said lid being opened.

9. The system of claim 1 wherein each of said lamps is housed within a protective, waterproof tube.

10. The system of claim 7 wherein said lid has an inside surface comprising a reflective panel to reflect UV light from said array of lamps.

11. The system of claim 7 further comprising at least one additional array of ultra-violet lamps in said treatment chamber.

12. The system of claim 7 wherein said treatment chamber has a substantially planar, horizontal bottom surface.

13. The system of claim 7 wherein said treatment chamber has a bottom surface, at least a portion of which is angled and disposed substantially parallel to said ultra-violet lamps.

14. A wastewater disinfection system, comprising:
- a flow-through treatment chamber for treating wastewater, said chamber having an inlet end and an outlet end for the wastewater and a hingedly mounted lid;
- a plurality of tube-type ultra-violet lamps positioned in a parallel array within said treatment chamber during operation of the system, said array of lamps disposed at an acute angle with respect to the flow of the wastewater therethrough so that the wastewater passes through said array of ultra-violet lamps as it flows through said treatment chamber and is thereby disinfected; and
- rack means for supporting said array of lamps in said treatment chamber at the desired angle, said rack means being suspended from said lid such that said rack means and said array of lamps are lifted from said chamber when said lid is pivoted to an open position, thereby facilitating cleaning said lamps.

15. The system of claim 14 wherein said lid has an inside surface comprising a reflective panel to reflect UV light from said array of lamps.

16. The system of claim 14 further comprising means for controlling the operation of said system.

17. The system of claim 16 wherein said control means automatically disengages the system in response to said lid being opened.

* * * * *